United States Patent [19]
Sakamoto

[11] Patent Number: 6,108,690
[45] Date of Patent: Aug. 22, 2000

[54] ELECTRICAL MAIL SYSTEM GUARANTEEING ACCURATELY RECEIVED CONTENT

[75] Inventor: Mineyuki Sakamoto, Tokyo, Japan

[73] Assignee: NEC Corporation, Tokyo, Japan

[21] Appl. No.: 09/026,552

[22] Filed: Feb. 20, 1998

[30]         Foreign Application Priority Data

Feb. 25, 1997  [JP]  Japan ................................ 9-040709

[51] Int. Cl.[7] ................................................. G06F 15/16
[52] U.S. Cl. ....................... 709/206; 709/200; 709/201; 709/205; 709/246; 709/250; 707/10; 707/104
[58] Field of Search .................................... 709/200–201, 709/204–207, 223–224, 245–246, 249–250; 707/1, 10, 104

[56]               References Cited

U.S. PATENT DOCUMENTS

| | | | |
|---|---|---|---|
| 5,557,736 | 9/1996 | Hirosawa et al. ........................ | 714/4 |
| 5,627,764 | 5/1997 | Schutzman et al. ..................... | 709/207 |
| 5,781,901 | 7/1998 | Kuzma ...................................... | 707/10 |
| 5,841,977 | 11/1998 | Ishizaki et al. .......................... | 709/204 |
| 5,841,982 | 11/1998 | Brouwer et al. ........................ | 709/224 |
| 5,903,723 | 5/1999 | Beck et al. .............................. | 709/200 |

FOREIGN PATENT DOCUMENTS

| | | | |
|---|---|---|---|
| 2-202144 | 8/1990 | Japan ............................ | H04L 12/54 |
| 4-129352 | 4/1992 | Japan ............................ | H04L 11/20 |
| 7-44392 | 2/1995 | Japan ............................ | G06F 13/00 |
| 9-51354 | 2/1997 | Japan ............................ | G06F 13/00 |

OTHER PUBLICATIONS

Japanese Office Action, dated Dec. 15, with English language translation of Japanese Examiner's comments. (No Date) (No Year).

*Primary Examiner*—Ahmad F Matar
*Assistant Examiner*—Bharat Barot
*Attorney, Agent, or Firm*—McGuire, Woods, Battle & Boothe, LLP

[57]                ABSTRACT

In an electrical mail system, it causes received file to prove whether or not it is identical with transmitted file, thus there is no danger that file with wrong content is used. An electrical mail system in which there is provided a plurality of terminals connected by telecommunication lines, and in which respective terminals transmits and receives electrical mails one another. A terminal of transmission side transmits a file to-be-transmitted, and a necessary data for examining whether or not the file to-be-transmitted is capable of being received accurately as an different electrical mail respectively. A terminal of reception side receives these electrical mails, before examining whether or not the file to-be-transmitted is capable of being received accurately, while collating the file to-be-transmitted obtained from the received electrical mail with the data, thus guaranteeing content of the electrical mail.

5 Claims, 3 Drawing Sheets

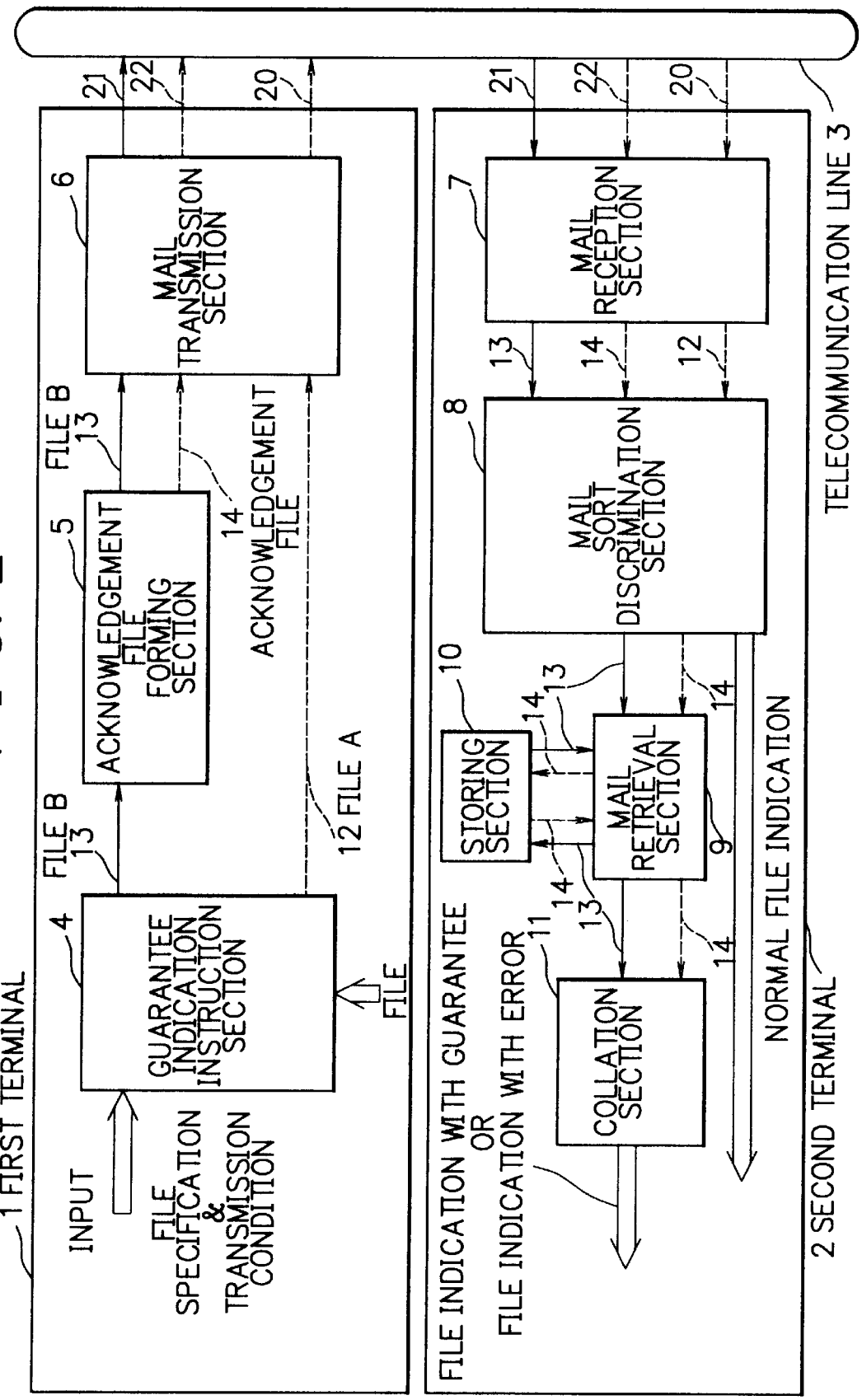

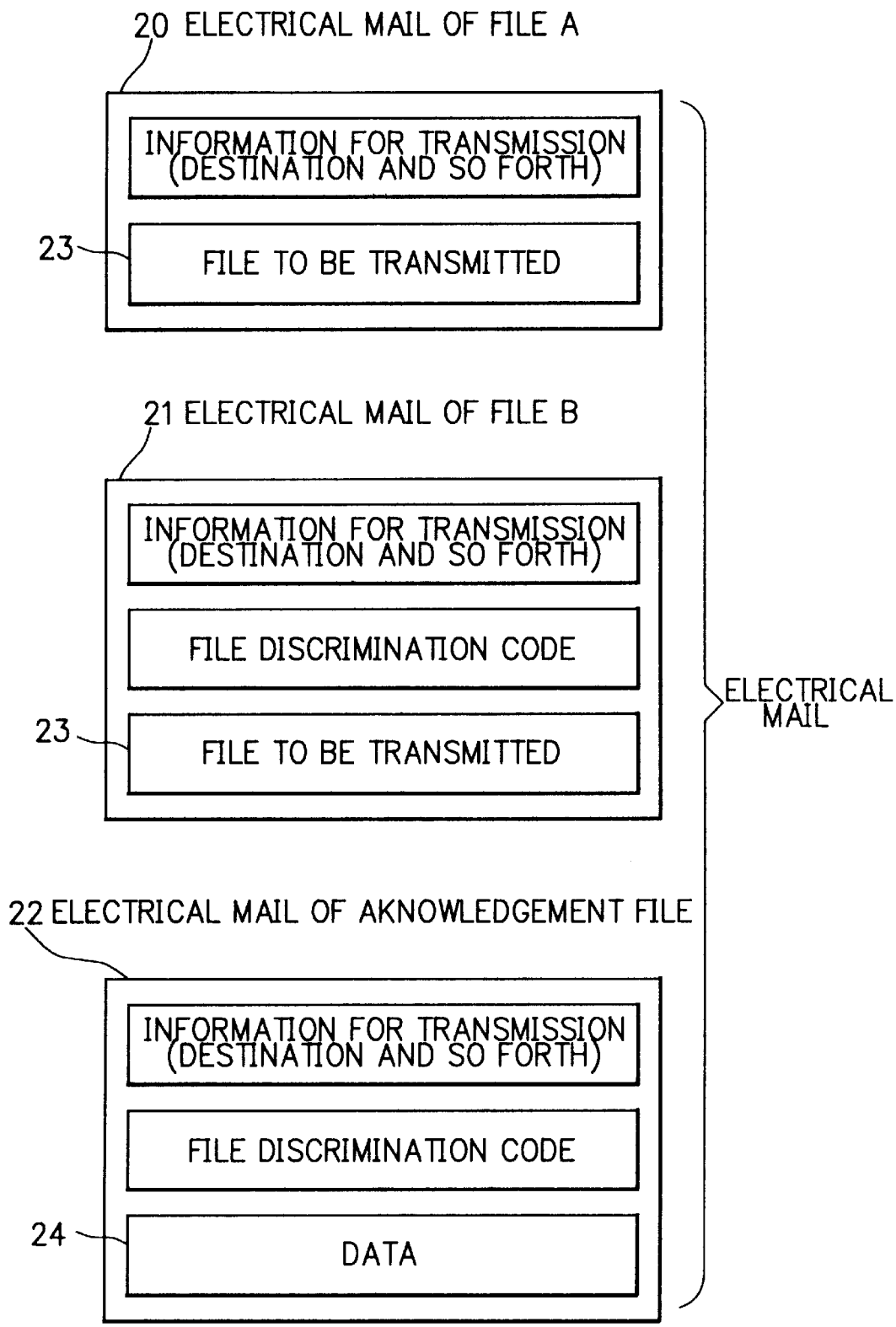

ELECTRICAL MAIL SYSTEM GUARANTEEING ACCURATELY RECEIVED CONTENT

BACKGROUND OF THE INVENTION

The present invention relates to an electrical mail system. More to particularly this invention relates to an electrical mail system in which there are provided therewith a plurality of stations connected by telecommunication line, respective stations thereof transmits and receives an electrical mail one another.

DESCRIPTION OF THE PRIOR ART

Formerly, for example, as shown in the Japanese Patent Application Laid-Open No. HEI 4-129352, this kind of electrical mail system is used for transmitting and receiving an electrical mail while connecting respective stations of personal computer and so forth through telecommunication line.

FIG. 1 is a block diagram showing a conventional electric mail system. Referring to FIG. 1, the conventional electrical mail system comprises a first station 25 such as for example a personal computer and so forth for transmitting a file to-be-transmitted specified beforehand from mail transmitting section as an electrical mail, and a second station 26 for indicating a file in the received electrical mail, while receiving the electrical mail through telecommunication line 3 by a mail reception section.

Since above described conventional electrical mail system transmits only the file to-be-transmitted as an electrical mail due to the first terminal, and indicates the received file as it is, while receiving this electrical mail, it is incapable of understanding whether the indicated file is identical with the file transmitted from the first station, thus there is a problem that it is danger of use of file with incorrect content.

SUMMARY OF THE INVENTION

In view of the foregoing, it is an object of the present invention for resolving the above-mentioned problem to provide an electrical mail system in which it is capable of understanding whether or not the file received to be indicated is identical with the file transmitted, consequently, there is no danger of use of file with incorrect content.

In accordance with one aspect of the present invention, for achieving the above-mentioned object, there is provided an electrical mail system in which there is provided a plurality of terminals connected by telecommunication lines, and in which respective terminals transmits and receives electrical mails one another, the electrical mail system comprises an examining means for examining whether or not content of the electrical mail is capable of being received accurately, thus guaranteeing the content of the electrical mail.

In accordance with another aspect of the present invention, there is provided an electrical mail system in which there is provided a plurality of terminals connected by telecommunication lines, and in which respective terminals transmit and receive electrical mails one another, the electrical mail system comprises a first terminal for transmitting a file to-be-transmitted as an electrical mail and necessary data for examining whether or not the file to-be-transmitted which is content of the electrical mail is capable of being received accurately as another electrical mail which is different from the electrical mail, and a second terminal for receiving the electrical mail and the another electrical mail and for guaranteeing content of the electrical mail by examining whether or not the file to-be-transmitted which is content of the electrical mail is capable of being received accurately while using the data received by the another electrical mail.

Preferably there is provided an electrical mail system, wherein the first terminal comprises a guarantee indication instruction section for receiving a specification of the file to-be-transmitted and a transmission condition for instructing whether or not it causes indication of guarantee to add to indication of file when the file is received accurately, when the searched result denotes that indication of guarantee is not added, the file to-be-transmitted is outputted as file A, while when the searched result denotes that indication of guarantee is added, adding the file to-be-transmitted to the file discrimination code for discriminating file, thus outputting as the file B, an acknowledgement file forming section for receiving the file B outputted from the guarantee indication instruction section, and for making necessary data from the file B for examining whether or not the file to-be-transmitted is capable of being received accurately, thus adding the file discrimination code to the data to render it an acknowledgement file, and for outputting the acknowledgement file and the file B, and a mail transmission section for receiving the file A outputted from the guarantee indication instruction section, thus rendering these files the electrical mails to transmit to the telecommunication line respectively.

Preferably, there is provided an electrical mail system, wherein the second terminal comprises a mail reception section for receiving the electrical mail transmitted from the first station through the telecommunication line, and for outputting the file while taking the file out of the received electrical male, a mail sort discrimination section for receiving the file outputted from the mail reception section, thus examining whether or not there exists the file discrimination code in the received file, when there exists no file discrimination code, causing the received file from the mail reception section to indicate, while when there exists the file discrimination code, outputting the received file, a storing section for storing temporarily the file outputted from the mail sort discrimination section, a mail retrieval section for receiving the file outputted from the mail sort discrimination section, thus retrieving a file corresponding to the received file having the same file discrimination code as the file discrimination code within this file due to the file discrimination code from the storing section, when the file corresponding to the received file from the mail sort discrimination section is retrieved, outputting the retrieved file and the received file from the mail sort discrimination section, while when the file corresponding to the received file from the mail sort discrimination section is not retrieved, thus storing the received file from the mail sort discrimination section, and a collation section for receiving the file outputted from the mail retrieval section and the file outputted from mail sort discrimination section, causing the data to pull while eliminating the file discrimination code in the file B from the received file B received from the mail retrieval section, which data is required for examining whether or not the file to-be-transmitted is capable of being received accurately, while it causes the file to pull while eliminating the file discrimination code from the file B received from the mail retrieval section, for collating these pulled data with the file to-be-transmitted, thus examining whether or not the file to-be-transmitted is capable of being received accurately, when the accurate reception of the file to-be-transmitted is proved, causing the guarantee indication to indicate, while when the accurate reception of the file to-be-transmitted is not proved, it causes error to indicate by adding it to the file to-be-transmitted.

Preferably, there is provided an electrical mail system, wherein the file discrimination code is combination of numerals, the alphabet, and the code.

Preferably, there is provided an electrical mail system, wherein the necessary data for examining whether or not the file to-be-transmitted is capable of being received accurately is identical with the file to-be-transmitted itself.

Preferably, there is provided an electrical mail system, wherein the first terminal includes the second terminal, while the second terminal includes the first terminal, thus respective terminals is capable of implementing transmission and reception of the electrical mail.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 2 is a block diagram showing one embodiment of an electrical mail system according to the present invention; and FIG. 3 is a view showing one example of constitution of the electrical mail.

DETAILED DESCRIPTION OF THE PREFERRED EMBODIMENTS

Figure 1:
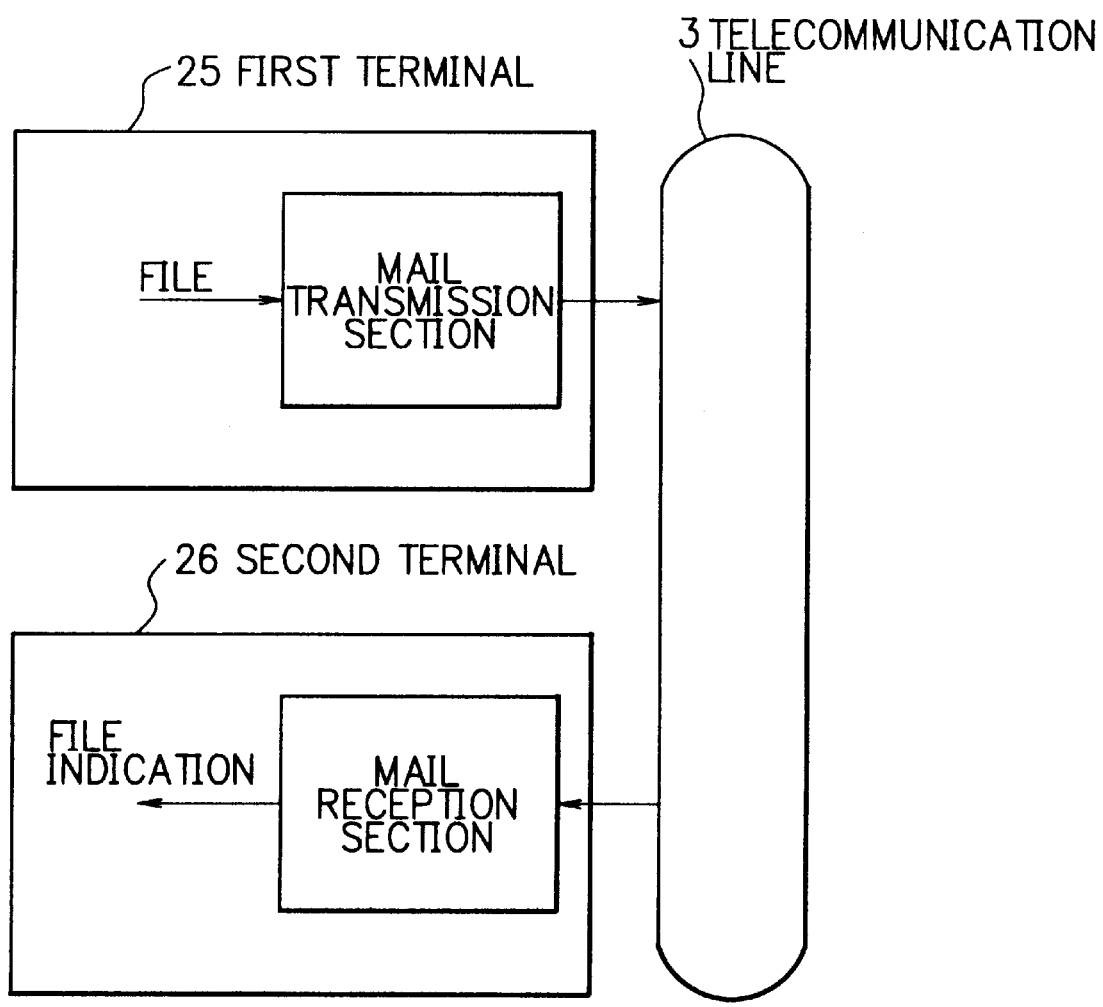
FIG. 1 is a block diagram showing a conventional electrical mail system.

A preferred embodiment of the present invention will now be described in detail referring to the accompanying drawings.

FIG. 2 is a block diagram showing one embodiment of an electrical mail system according to the present invention.

FIGS. 2 and 3 shows the embodiment. In the electrical mail system of the embodiment, a plurality of stations such as personal computer and so forth are connected to one another by telecommunication line 3, respective stations transmits and receives the electrical mail one another. There is provided therewith a first station 1 which is formed by a personal computer and so forth. The first station 1 transmits a file 23 to-be-transmitted as an electrical mail. The content of the transmitted electrical mail is the file 23 to-be-transmitted. A data 24 is used for examining whether or not the file 23 to-be-transmitted is capable of being received. The first station 1 transmits data 24 as an another electrical mail which differs from the above-described electrical mail. There is provided therewith a second station 2 which is formed by a personal computer and so forth. The second station 2 receives the electrical mail and the another electrical mail. The second station 2 examines whether or not the file 23 which is the content of the electrical mail to-be-transmitted is capable of being received accurately, while using the data 24 received by the another electrical mail. Thereby it guarantees the content of the electrical mail. The electrical mail system of the embodiment comprises the first station and the second station.

The first station 1 comprises a guarantee indication instruction section 4, an acknowledgement file forming section 5, and a mail transmission section 6. The guarantee indication instruction section 4 receives the file 23 to-be-transmitted specified beforehand and transmission condition specified beforehand for instructing whether or not it causes the indication of guarantee to add to indication of the file when the file is received accurately. When the transmission condition denotes that it causes no indication of guarantee to add, outputting the file 23 to-be-transmitted as file A12, while when the transmission condition denotes that it causes indication of guarantee to add, outputting the file 23 to-be-transmitted as file B13 while adding file identification code for discriminating file to the file 23 to-be-transmitted. The acknowledgement file forming section 5 makes data 24 from the file B13 which data 24 is necessary for examining whether or not the file 23 to-be-transmitted specified beforehand. The acknowledgement file forming section 5 outputs an acknowledgement file 14 and the file B13, while forming acknowledgement file by adding the file discrimination code to the data 24. The mail transmission section 6 receives the file A12, the file B13, and the acknowledgement file 14 to transmit these files as the electrical mails 20, 21 and 22 to respective telecommunication line 3.

The second station 2 comprises a mail reception section 7 for receiving the electrical mails 20, 21 and 22 transmitted from the first station 1 through the telecommunication line 3, and for outputting as file, a mail sort discrimination section 8 which receives the file outputted from the mail reception section 7, which examines whether or not file discrimination code exists in the received file, when no file discrimination code exists, causing received file to indicate, while when the file discrimination code exists, outputting the received file, a storing section 10 for storing temporarily the file outputted from the mail sort discrimination section 8, a mail retrieval section 9 which receives the file outputted from the mail sort discrimination section 8, and which retrieves a file corresponding to the received file having the same file discrimination code as file discrimination code of this file due to the file discrimination code from the storing section 10, when above file is retrieved, causing the file retrieved and the file received from the mail sort discrimination section 8 to output, while when above file is not retrieved, causing the file received from the mail sort discrimination section 8 to store in the storing section 10, and a collating section 11 which receives the file outputted from the mail retrieval section 9 to be retrieved and the file received from the mail sort discrimination section 8, data 24 which is required for examining whether or not the file 23 to-be-transmitted is capable of being received accurately, being obtained such that it causes the file discrimination code in the acknowledgement file 14 to eliminate from the acknowledgement file 14 which corresponds to either one file of the files received from the mail retrieval section 9 to be pulled, while the file 23 to-be-transmitted being obtained such that it causes the file discrimination code in the file B13 to eliminate from the file B13 which corresponds to the other file received from the mail retrieval section 9 to be pulled, which collating section 11 collates the pulled data 24 and the file 23 to examine whether or not the file 23 to-be-transmitted is capable of received accurately, when the accurate reception is proved, causing the guarantee indicating the accurate reception to add to be indicated to the file 23 to-be-transmitted, while when the accurate reception is not proved, causing error indicating inaccurate reception to add to be indicated to the file 23 to-be-transmitted.

Next, operation of the electrical mail system according to the embodiment will be described in detail referring to FIG. 3.

FIG. 3 is a view showing one example of constitution of the electrical mail.

Operation of the first station 1 will be described referring to FIG. 2.

An operator of the first station 1 inputs a specification of file such as z document file and so forth to-be-transmitted which is prepared beforehand from an input section (not illustrated), and a transmission condition for instructing whether or not it causes indication of guarantee to add to indication of file when the file is received accurately. The guarantee indication instruction section 4 receives the specification of the file 23 to-be-transmitted and the transmission condition. The guarantee indication instruction section 4 inputs the specified file from the file storing section 10 such as a memory and so forth not illustrated, and searches the transmission condition inputted from the input section, when the searched result denotes that indication of guarantee is not added, the file 23 to-be-transmitted is outputted as file A12, while when the searched result denotes that indication of guarantee is added, adding the inputted file 23 to-be-transmitted to the file discrimination code for discriminating file, thus outputting as the file B13.

The file discrimination code is combination of a numeral, the alphabet, and the code, it is proper that the file discrimination code is only numeral or alphabet.

Next, the acknowledgement file forming section 5 receives the file B13 outputted from the guarantee indication instruction section 4, and which acknowledgement file forming section 5 forms necessary data 24 from the file B13 for examining whether or not the file 23 to-be-transmitted is capable of being received accurately, thus adding the file discrimination code to the data 24 to render it acknowledgement file 14, and which acknowledgement file forming section 5 outputs the acknowledgement file 14 and the file B13. And then, the mail transmission section 6 receives the file A12 outputted from the guarantee indication instruction section 4, the file B13 outputted from the acknowledgement file forming section 4, and the acknowledgement file 14, thus rendering these files the electrical mails as shown in FIG. 3 to transmit to the telecommunication line 3 respectively.

Next, operation of the second station will be described.

The mail reception section 7 receives the electrical mail transmitted from the first station 1 through the telecommunication line 3, and which mail reception section 7 outputs the file while taking the file out of the received electrical male. The mail sort discrimination section 8 receives the file outputted from the mail reception section 7, thus examining whether or not there exists the file discrimination code in the received file, when there exist no file discrimination code, causing the received file from the mail reception section 7 to indicate to a display device and so forth not illustrated, while when there exists the file discrimination code, outputting the received file. The mail retrieval section 9 receives the file outputted from the mail sort discrimination section 8, thus retrieving the file corresponding to the received file having the same file discrimination code as the file discrimination code within this file due to the file discrimination code from the storing section 10. Namely, when for example, the received file is the file B13, thus retrieving the acknowledgement file 14 having the same file discrimination code as the file discrimination code in the file B13, while when for example, the received file is the acknowledgement file 14, thus retrieving the file B13 having the same file discrimination code as the file discrimination code in the acknowledgement file 14. And then, the mail retrieval section 9, when the file corresponding to the received file from the mail sort discrimination section 8 is retrieved, outputs the retrieved file and the received file from the mail sort discrimination section 8, namely, outputs the file B13 and the acknowledgement file 14 corresponding to the file B13, while when the file corresponding to the received file from the mail sort discrimination section 8 is not retrieved, thus storing the received file from the mail sort discrimination section 8 namely, the file B13 or the acknowledgement file 14 into storing section 10.

The collation section 11 receives the file B13 outputted from the mail retrieval section 9 and the acknowledgement file 14 corresponding to the file B13, which collation section 11 causes the data 24 to pull while eliminating the file discrimination code in the file B13 from the received file B13 received from the mail retrieval section 9, which data 24 is required for examining whether or not the file 23 to-be-transmitted is capable of being received accurately, while it causes the file 23 to pull while eliminating the file discrimination code from the file B13 received from the mail retrieval section 9. The collation section 11 collates these pulled data 24 with the file 23 to-be-transmitted, thus examining whether or not the file 23 to-be-transmitted is capable of being received accurately.

At this time, the data 24 is proper in that it is capable of collating with the file 23 to-be-transmitted, such as for example, the data 24 is the same file as the file 23 to-be-transmitted, or the data 24 is the file of character-string which is taken out of the file 23 with N-character spacing.

The collating section 11, when the accurate reception of the file 23 to-be-transmitted is proved, causes the guarantee indication to indicate by indicating device and so forth not illustrated, while adding the guarantee indication to the file 23 to-be-transmitted, which guarantee indication indicates that the file 23 is received accurately, while when the accurate reception of the file 23 to-be-transmitted is not proved, it causes error to indicate by the indicating device and so forth not illustrated, while adding the error to the file 23 to-be-transmitted, which error indicates that the file 23 is received inaccurately.

In the above explanation, it causes the electrical mail to transmit from the first terminal 1, thus receiving the electrical mail at the second terminal 2. The second terminal 2 is added to the first terminal 1, and the first terminal 1 is added to the second terminal 2, it is proper that these added terminals cause transmission/reception of the electrical mails to implement respectively.

As described above, the electrical mail system according to the present invention, the terminal of the transmission side transmits the file to-be-transmitted and the necessary data for examining whether or not the file to-be-transmitted is capable of being received accurately as the respective different mails. The terminal of the reception side receives these electrical mails. The terminal of the reception side collates the file to-be-transmitted with the data both of which are received thereby from the transmitted electrical mails. The terminal of the reception side guarantees content of electrical mail by examining whether or not the file to-be-transmitted is capable of received accurately, thereby it is proved whether or not the received file is identical with the transmitted file. There is no danger that the file with wrong content is used.

While preferred embodiments of the invention have been described using specific terms, such description is for illustrative purpose only, and it is to be understood that changes variations may be made without departing from the spirit or scope of the following claims.

What is claimed is:

1. An electrical mail system in which there is provided a plurality of terminals connected by telecommunication lines, and in which respective terminals transmit and receive electrical mailes, comprising:

a first terminal for transmitting a file to-be-transmitted as an electrical mail and necessary data for examining whether or not said file to-be-transmitted which is content of said electrical mail is capable of being received accurately as another electrical mail which is different from said electrical mail, said first terminal comprising a guarantee indication instruction section for receiving a specification of said file to-be-transmitted and a transmission condition for instructing whether or not it causes indication of guarantee to add to indication of file when said file is received accurately, when the searched result denotes that indication of guarantee is not added, said file to-be-transmitted is outputted as a file A, while when the searched result denotes that indication of guarantee is added, adding said file to-be-transmitted to a file discrimination code for discriminating file, thus outputting as a file B;

an acknowledgment file forming section for receiving said file B outputted from said guarantee indication instruction section, and for making necessary data from said file B for examining whether or not said file to-be-transmitted is capable of being received accurately, thus adding said file discrimination code to said data to render it an acknowledgment file, and for outputting said acknowledgment file and said file B; and a mail transmission section for receiving said file A outputted from said guarantee indication instruction section, thus rendering these files the electrical mails to transmit to said telecommunication line respectively; and a second terminal for receiving said electrical mail and said another electrical mail and for guaranteeing content of said electrical mail by examining whether or not said file to-be-transmitted which is content of said electrical mail is capable of being received accurately while using said data received by said another electrical mail.

2. A electrical mail system as claimed in claim 1, wherein said second terminal comprises:

a mail reception section for receiving said electrical mail transmitted from said first terminal through said telecommunication line, and for outputting said file while taking said file out of the received electrical male;

a mail sort discrimination section for receiving said file outputted from said mail reception section, thus examining whether or not there exists said file discrimination code in the received file, when there exists no file discrimination code, causing the received file from the mail reception section to indicate, while when there exists the file discrimination code, outputting the received file;

a storing section for storing temporarily said file outputted from said mail sort discrimination section;

a mail retrieval section for receiving said file outputted from said mail sort discrimination section, thus retrieving a file corresponding to said received file having the same file discrimination code as the file discrimination code within this file due to said file discrimination code from said storing section, when the file corresponding to the received file from said mail sort discrimination section is retrieved, outputs the retrieved file and the received file from the mail sort discrimination section, while when the file corresponding to the received file from said mail sort discrimination section is not retrieved, thus storing the received file from said mail sort discrimination section; and a collation section for receiving said file outputted from said mail retrieval section and said file outputted from mail sort discrimination section, causing the data to pull while eliminating said file discrimination code in the file B from the received file B received from said mail retrieval section, which data is required for examining whether or not the file to-be-transmitted is capable of being received accurately, while it causes the file to pull while eliminating said file discrimination code from the file B received from said mail retrieval section, for collating these pulled data with said file to-be-transmitted, thus examining whether or not said file to-be-transmitted is capable of being received accurately, when the accurate reception of said file to-be-transmitted is proved, causing the guarantee indication to indicate, while when the accurate reception of said file to-be-transmitted is not proved, it causes error to indicate by adding it to said file to-be-transmitted.

3. An electrical mail system as claimed in claim 2, wherein said file discrimination code is combination of numerals, the alphabet, and the code.

4. An electrical mail system as claimed in claim 2, wherein said necessary data for examining whether or not said file to-be-transmitted is capable of being received accurately is identical with said file to-be-transmitted itself.

5. An electrical mail system as claimed in claim 4, wherein said first terminal includes said second terminal, while said second terminal includes said first terminal, thus respective terminals is capable of implementing transmission and reception of said electrical mail.

* * * * *